US012628123B2

(12) United States Patent
Hong

(10) Patent No.: US 12,628,123 B2
(45) Date of Patent: May 12, 2026

(54) INDICATION METHOD AND APPARATUS, AND PAGING CONTROL METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 343 days.

(21) Appl. No.: 18/285,955

(22) PCT Filed: Apr. 9, 2021

(86) PCT No.: PCT/CN2021/086287
§ 371 (c)(1),
(2) Date: Oct. 6, 2023

(87) PCT Pub. No.: WO2022/213394
PCT Pub. Date: Oct. 13, 2022

(65) Prior Publication Data
US 2024/0121754 A1 Apr. 11, 2024

(51) Int. Cl.
*H04W 68/02* (2009.01)
*H04W 88/06* (2009.01)

(52) U.S. Cl.
CPC ............ *H04W 68/02* (2013.01); *H04W 88/06* (2013.01)

(58) Field of Classification Search
None
See application file for complete search history.

(56) References Cited

U.S. PATENT DOCUMENTS

2020/0154395 A1* 5/2020 Bienas ................. H04W 48/16
2022/0240222 A1* 7/2022 Youn ................... H04W 60/005

FOREIGN PATENT DOCUMENTS

| CN | 112425225 A | 2/2021 |
| CN | 112514472 A | 3/2021 |
| EP | 3764717 A2 | 1/2021 |
| WO | WO 2012080377 A1 | 6/2012 |

OTHER PUBLICATIONS

PCT/CN2021/086287, International Search Report dated Dec. 29, 2021, 3 pages.
Indian Patent Application No. 202347076353, Office Action dated Jun. 30, 2025, 5 pages.
Chinese Patent Application No. 202180000804.X, Office Action with English translation dated Aug. 13, 2025, 19 pages.

* cited by examiner

*Primary Examiner* — Frantz Bataille
(74) *Attorney, Agent, or Firm* — Cozen O'Connor

(57) ABSTRACT
An indication method performed by a first base station includes: sending first indication information to a second base station. The first indication information is configured to indicate that a terminal paged by the second base station has received a paging from the second base station, but the terminal does not respond to the paging.

19 Claims, 13 Drawing Sheets send first indication information to a second base station, in which the first indication information is configured to indicate that a terminal paged by the second base station has received a paging from the second base station, but the terminal does not respond to the paging ~ S101 send first indication information to a second base station, in which the first indication information is configured to indicate that a terminal paged by the second base station has received a paging from the second base station, but the terminal does not respond to the paging    ⌇ S101

FIG. 1 sending the first indication information to the second base station, in response to determining, based on second indication information sent by a first SIM card, that a second SIM card has received the paging from the second base station, but the second SIM card does not respond to the paging    ⌇ S201

FIG. 2 send first indication information to a second base station, in which the first indication information is configured to indicate that a terminal paged by the second base station has received a paging from the second base station, but the terminal does not respond to the paging    ⌇ S101 determine, based on the second indication information, a reason why the terminal does not respond to the paging, in which the first indication information is further configured to indicate the reason why the terminal does not respond to the paging    ⌇ S301

FIG. 3

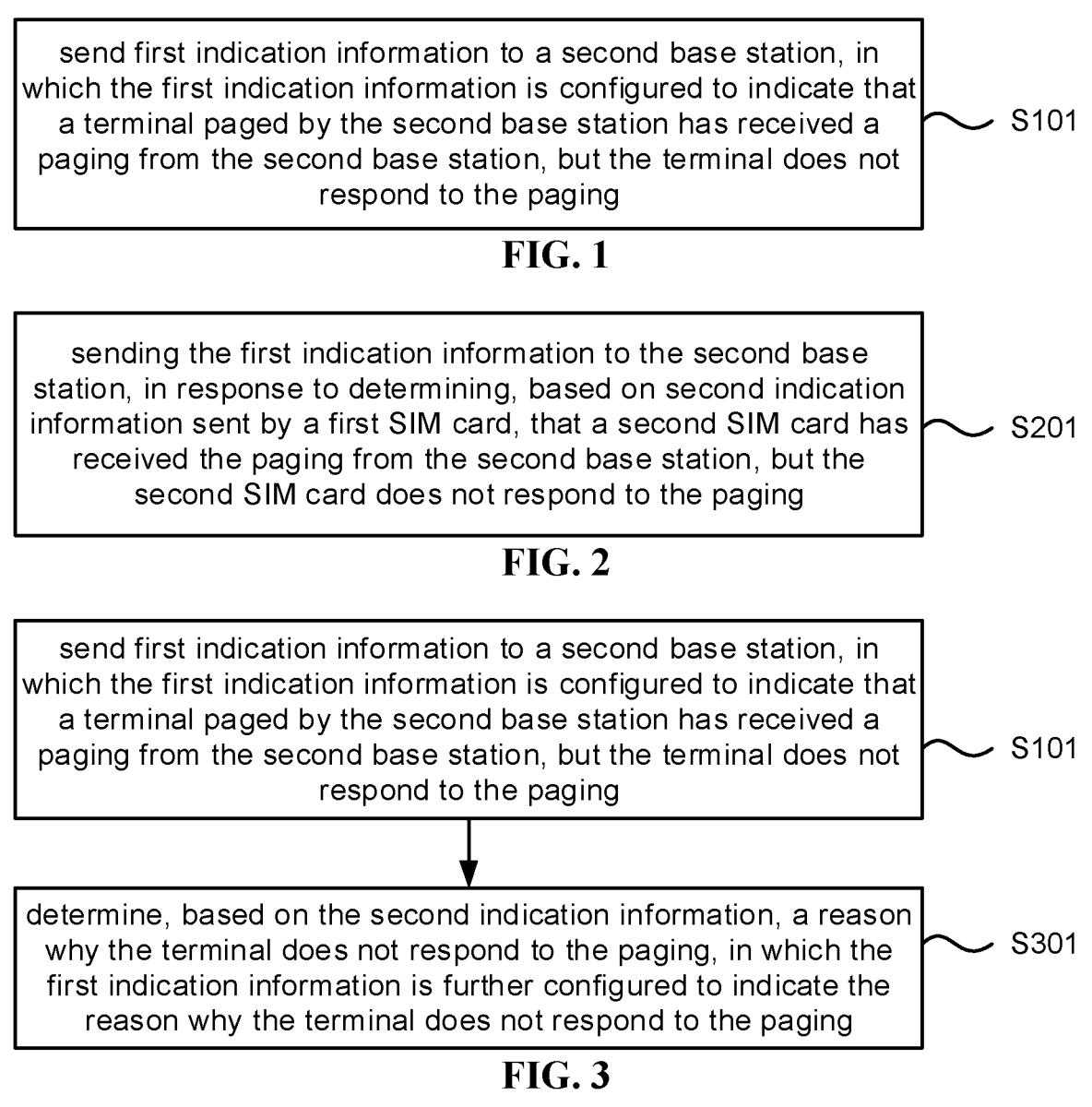

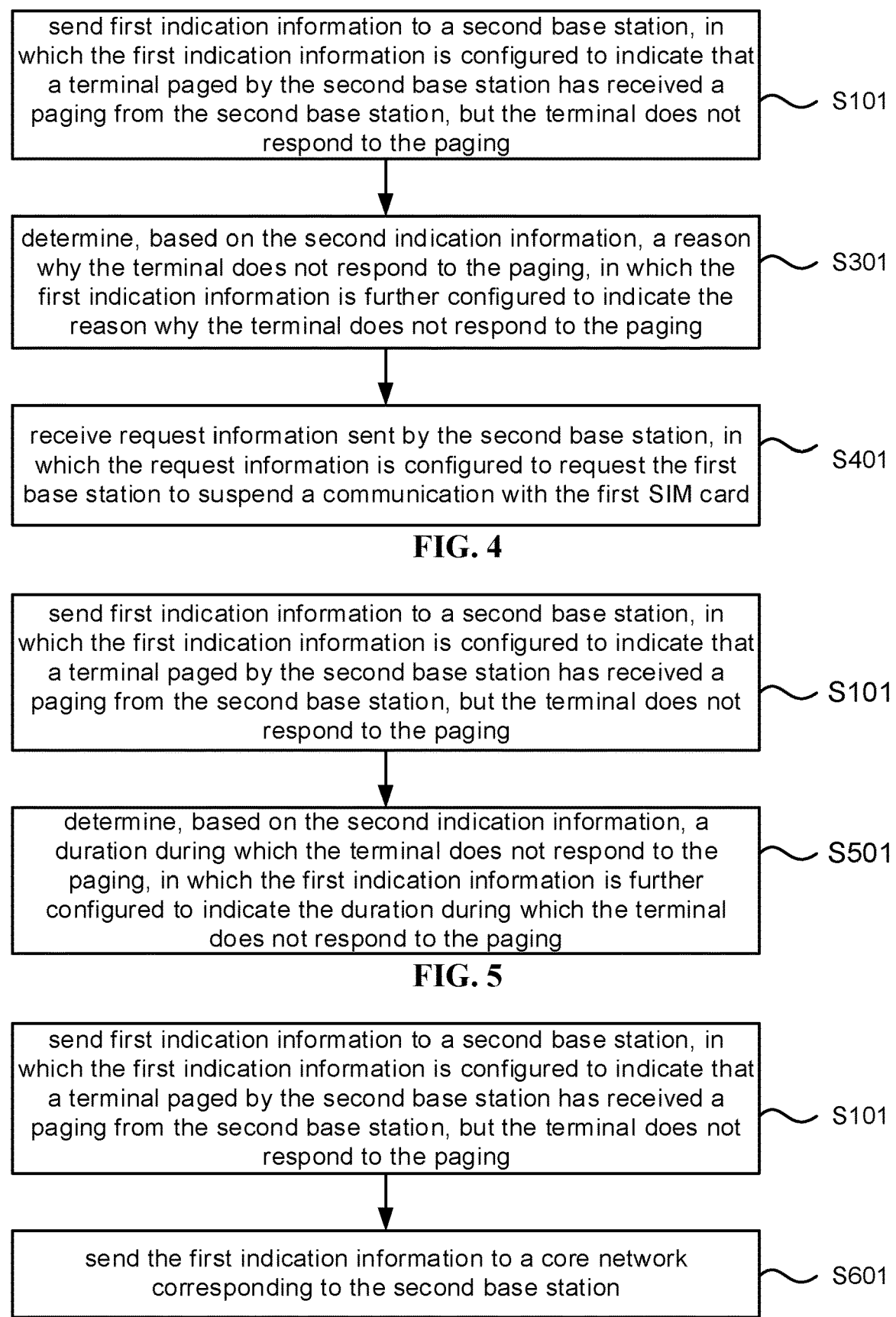

send first indication information to a second base station, in which the first indication information is configured to indicate that a terminal paged by the second base station has received a paging from the second base station, but the terminal does not respond to the paging ~ S101 determine, based on the second indication information, a reason why the terminal does not respond to the paging, in which the first indication information is further configured to indicate the reason why the terminal does not respond to the paging ~ S301 receive request information sent by the second base station, in which the request information is configured to request the first base station to suspend a communication with the first SIM card ~ S401

FIG. 4 send first indication information to a second base station, in which the first indication information is configured to indicate that a terminal paged by the second base station has received a paging from the second base station, but the terminal does not respond to the paging ~ S101 determine, based on the second indication information, a duration during which the terminal does not respond to the paging, in which the first indication information is further configured to indicate the duration during which the terminal does not respond to the paging ~ S501

FIG. 5 send first indication information to a second base station, in which the first indication information is configured to indicate that a terminal paged by the second base station has received a paging from the second base station, but the terminal does not respond to the paging ~ S101 send the first indication information to a core network corresponding to the second base station ~ S601

FIG. 6

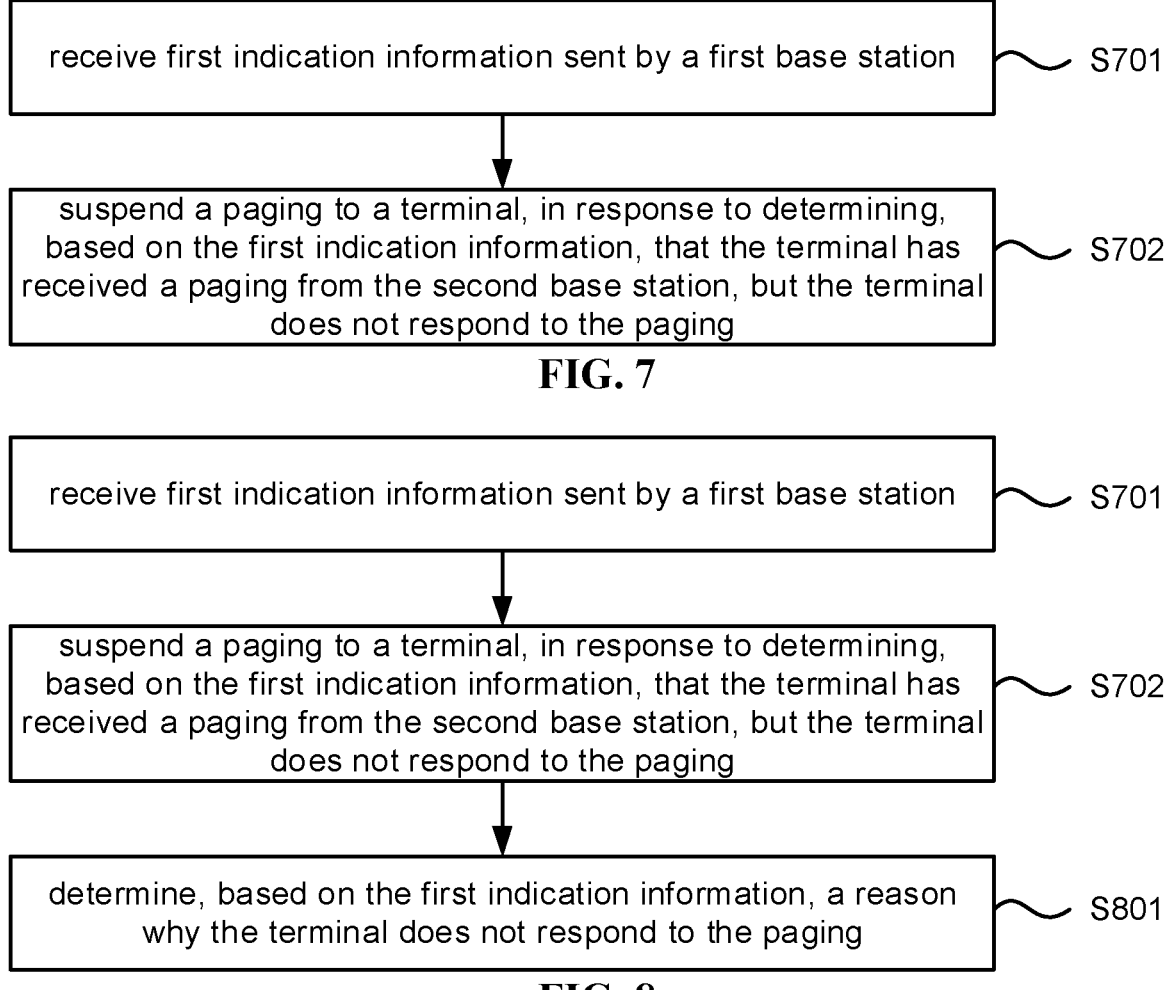

receive first indication information sent by a first base station — S701 suspend a paging to a terminal, in response to determining, based on the first indication information, that the terminal has received a paging from the second base station, but the terminal does not respond to the paging — S702

FIG. 7 receive first indication information sent by a first base station — S701 suspend a paging to a terminal, in response to determining, based on the first indication information, that the terminal has received a paging from the second base station, but the terminal does not respond to the paging — S702 determine, based on the first indication information, a reason why the terminal does not respond to the paging — S801

FIG. 8

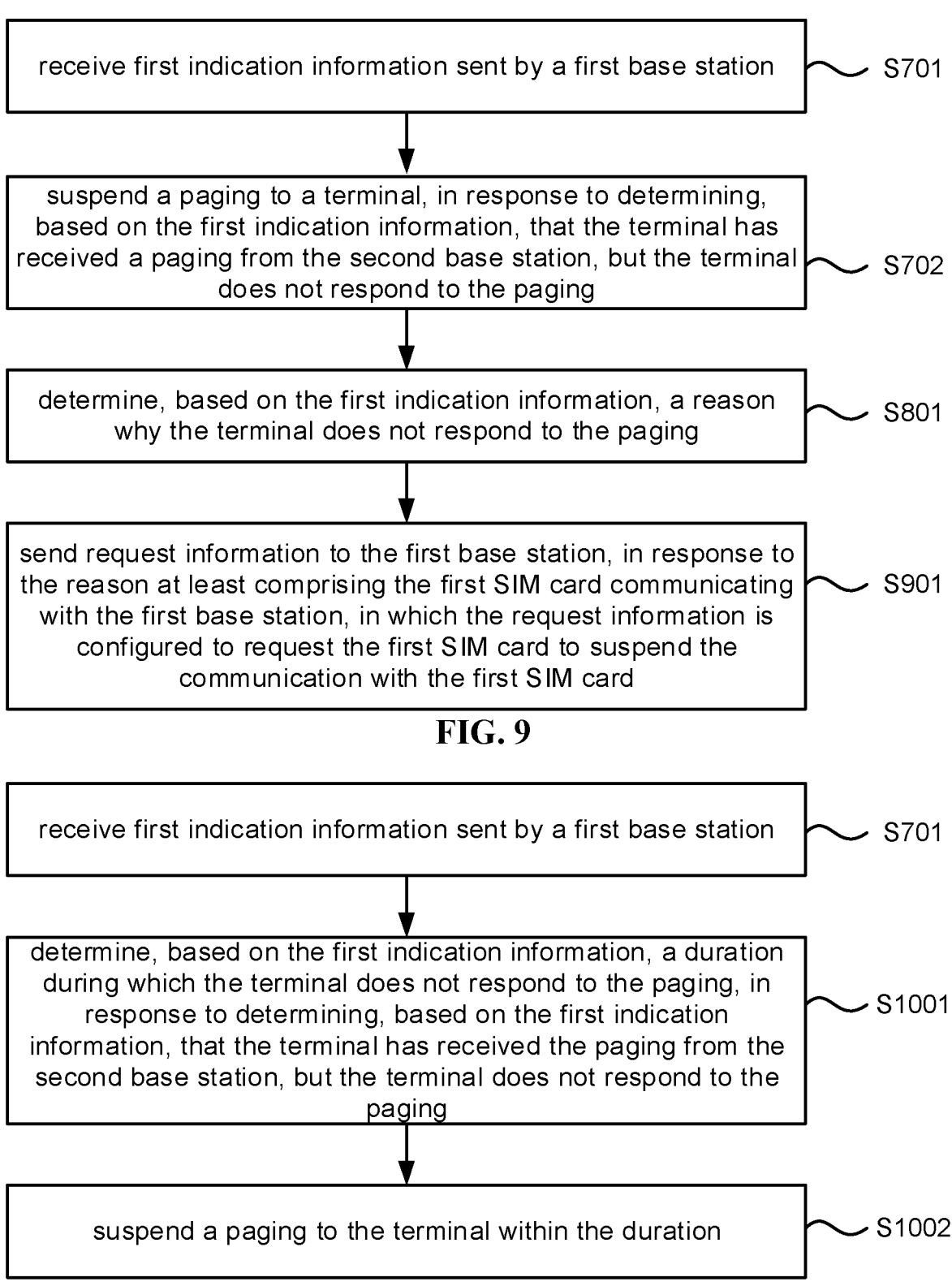

receive first indication information sent by a first base station — S701 suspend a paging to a terminal, in response to determining, based on the first indication information, that the terminal has received a paging from the second base station, but the terminal does not respond to the paging — S702 determine, based on the first indication information, a reason why the terminal does not respond to the paging — S801 send request information to the first base station, in response to the reason at least comprising the first SIM card communicating with the first base station, in which the request information is configured to request the first SIM card to suspend the communication with the first SIM card — S901

FIG. 9 receive first indication information sent by a first base station — S701 determine, based on the first indication information, a duration during which the terminal does not respond to the paging, in response to determining, based on the first indication information, that the terminal has received the paging from the second base station, but the terminal does not respond to the paging — S1001 suspend a paging to the terminal within the duration — S1002

FIG. 10

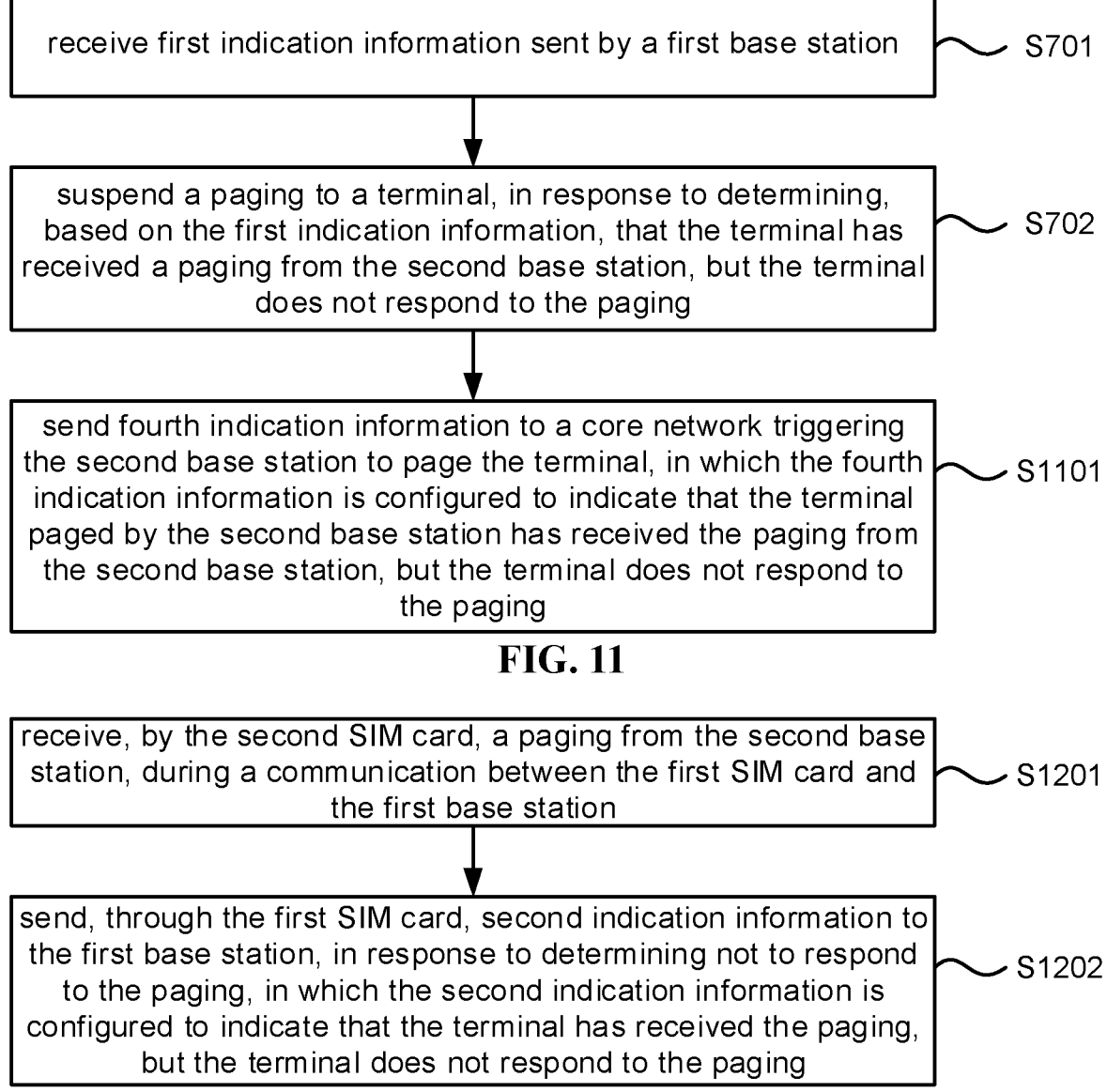

receive first indication information sent by a first base station          S701 suspend a paging to a terminal, in response to determining, based on the first indication information, that the terminal has received a paging from the second base station, but the terminal does not respond to the paging          S702 send fourth indication information to a core network triggering the second base station to page the terminal, in which the fourth indication information is configured to indicate that the terminal paged by the second base station has received the paging from the second base station, but the terminal does not respond to the paging          S1101

FIG. 11 receive, by the second SIM card, a paging from the second base station, during a communication between the first SIM card and the first base station          S1201 send, through the first SIM card, second indication information to the first base station, in response to determining not to respond to the paging, in which the second indication information is configured to indicate that the terminal has received the paging, but the terminal does not respond to the paging          S1202

FIG. 12

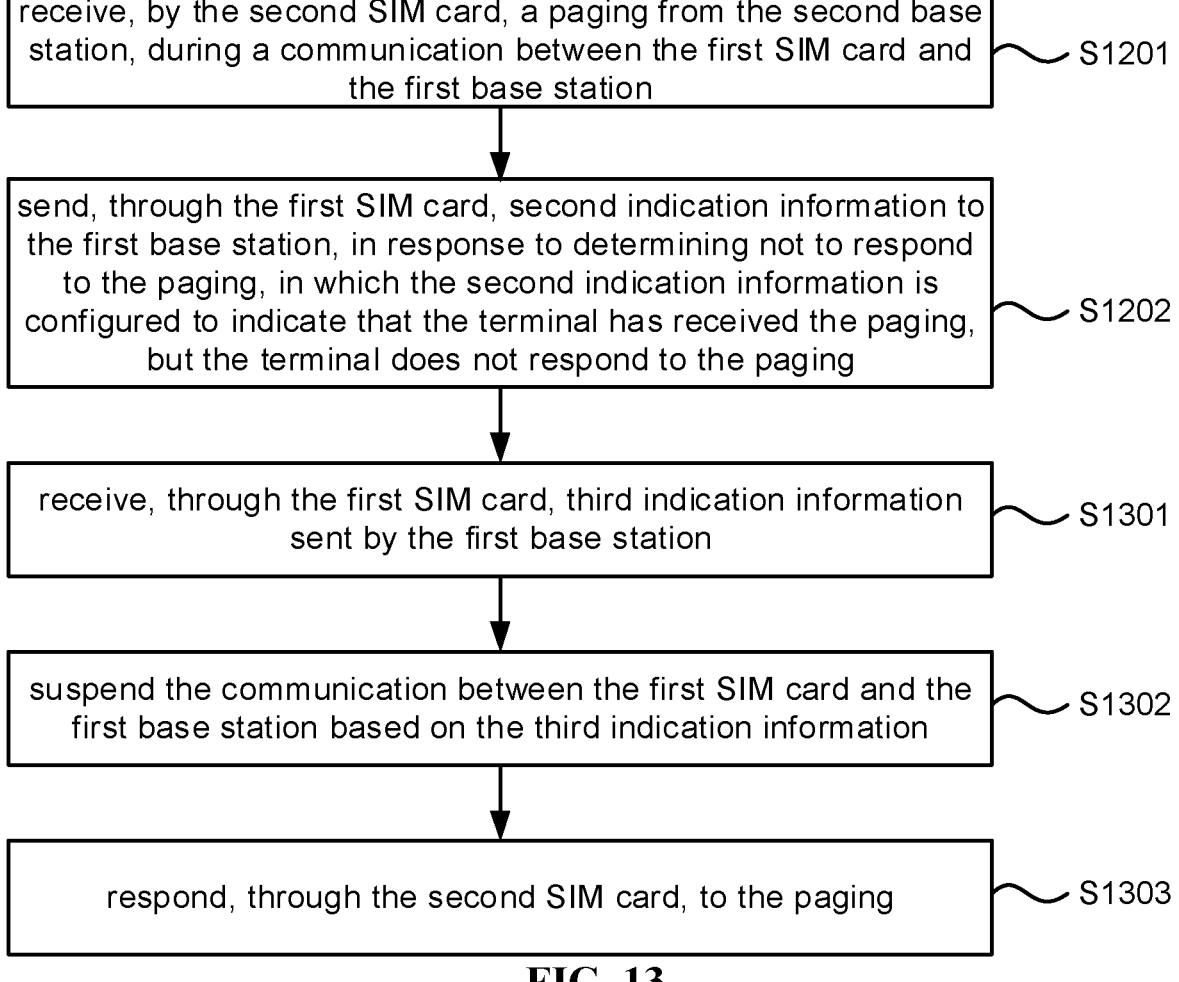

receive, by the second SIM card, a paging from the second base station, during a communication between the first SIM card and the first base station — S1201 send, through the first SIM card, second indication information to the first base station, in response to determining not to respond to the paging, in which the second indication information is configured to indicate that the terminal has received the paging, but the terminal does not respond to the paging — S1202 receive, through the first SIM card, third indication information sent by the first base station — S1301 suspend the communication between the first SIM card and the first base station based on the third indication information — S1302 respond, through the second SIM card, to the paging — S1303

FIG. 13 receive, by the second SIM card, a paging from the second base station, during a communication between the first SIM card and the first base station    S1201 send, through the first SIM card, second indication information to the first base station, in response to determining not to respond to the paging, in which the second indication information is configured to indicate that the terminal has received the paging, but the terminal does not respond to the paging    S1202 receive, through the first SIM card, third indication information sent by the first base station    S1301 suspend the communication between the first SIM card and the first base station based on the third indication information    S1302 respond, through the second SIM card, to the paging, in response to receiving, by the second SIM card, the paging after the communication between the first SIM card and the first base station is suspended    S1401

FIG. 14

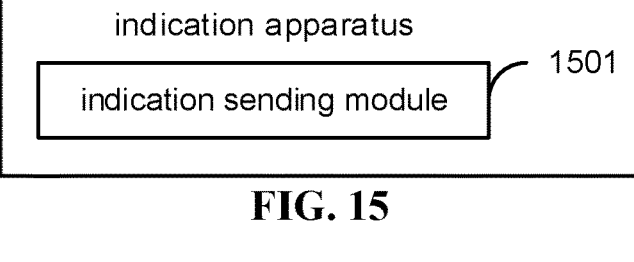

FIG. 15

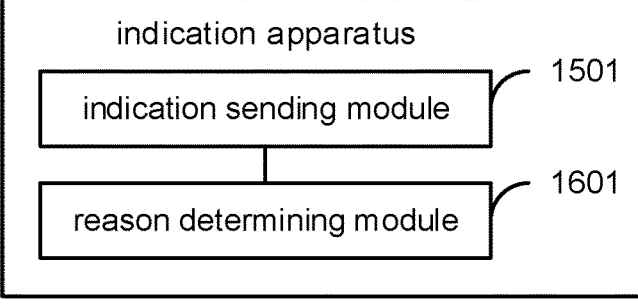

FIG. 16

INDICATION METHOD AND APPARATUS, AND PAGING CONTROL METHOD AND APPARATUS

CROSS-REFERENCE TO RELATED APPLICATION

This application is a U.S. national phase application of International Application No. PCT/CN2021/086287, filed on Apr. 9, 2021, the content of which is hereby incorporated by reference in its entirety for all purposes.

TECHNICAL FIELD

The disclosure relates to the field of communication technology, and in particular to an indication method, a paging control method, an indication apparatus, a paging control apparatus, a communication device and a computer-readable storage medium.

BACKGROUND

In a multi-card terminal, multiple Subscriber Identity Module (SIM) cards can be included, and the terminal can communicate through the multiple SIM cards. However, during a communication process, communication conflicts may occur between multiple SIM cards.

For example, when a first SIM card (denoted by SIM card #1) of a terminal communicates with a base station (denoted by base station A), a second SIM card (denoted by SIM card #2) of the terminal receives a paging from another base station (denoted by base station B). In this case, the terminal may decide not to respond to the paging from the base station B for keeping the communication between the SIM card #1 and the base station A uninterrupted. However, this inaction will cause the base station B to mistakenly determine that there is a problem with the paging, and thus continue paging the SIM card #2 and even increase the paging power, resulting in a waste of the resources of the base station B.

SUMMARY

According to a first aspect, an indication method is provided. The method is performed by a first base station. The method includes:

sending first indication information to a second base station;

in which the first indication information is configured to indicate that a terminal paged by the second base station has received a paging from the second base station, but the terminal does not respond to the paging.

According to a second aspect, a paging control method is provided. The method is performed by a second base station. The method includes:

receiving first indication information sent by a first base station; and suspending a paging to a terminal, in response to determining, based on the first indication information, that the terminal has received the paging from the second base station, but the terminal does not respond to the paging.

According to a third aspect, an indication method is provided. The method is performed by a terminal at least including a first Subscriber Identity Module (SIM) card and a second SIM card. The method includes:

receiving, by the second SIM card, a paging from a second base station during a communication between the first SIM card and a first base station; and sending second indication information to the first base station through the first SIM card in response to determining not to respond to the paging;

in which, the second indication information is configured to indicate that the terminal has received the paging, but the terminal does not respond to the paging.

BRIEF DESCRIPTION OF THE DRAWINGS

In order to illustrate the technical solutions according to embodiments of the disclosure clearly, the accompanying drawings used in the description of embodiments will be briefly described below. Obviously, the accompanying drawings in the following description are only some embodiments of the disclosure. For those of ordinary skill in the art, other drawings can also be obtained from these drawings without creative labor.

FIG. 1 is a schematic flowchart illustrating an indication method according to embodiments of the disclosure.

FIG. 2 is a schematic flowchart illustrating another indication method according to embodiments of the disclosure.

FIG. 3 is a schematic flowchart illustrating yet another indication method according to embodiments of the disclosure.

FIG. 4 is a schematic flowchart illustrating yet another indication method according to embodiments of the disclosure.

FIG. 5 is a schematic flowchart illustrating yet another indication method according to embodiments of the disclosure.

FIG. 6 is a schematic flowchart illustrating yet another indication method according to embodiments of the disclosure.

FIG. 7 is a schematic flowchart illustrating a paging control method according to embodiments of the disclosure.

FIG. 8 is a schematic flowchart illustrating another paging control method according to embodiments of the disclosure.

FIG. 9 is a schematic flowchart illustrating yet another paging control method according to embodiments of the disclosure.

FIG. 10 is a schematic flowchart illustrating yet another paging control method according to embodiments of the disclosure.

FIG. 11 is a schematic flowchart illustrating yet another paging control method according to embodiments of the disclosure.

FIG. 12 is a schematic flowchart illustrating an indication method according to embodiments of the disclosure.

FIG. 13 is a schematic flowchart illustrating another indication method according to embodiments of the disclosure.

FIG. 14 is a schematic flowchart illustrating yet another indication method according to embodiments of the disclosure.

FIG. 15 is a block diagram illustrating an indication apparatus according to embodiments of the disclosure.

FIG. 16 is a block diagram illustrating another indication method according to embodiments of the disclosure.

DETAILED DESCRIPTION

Figure 17:
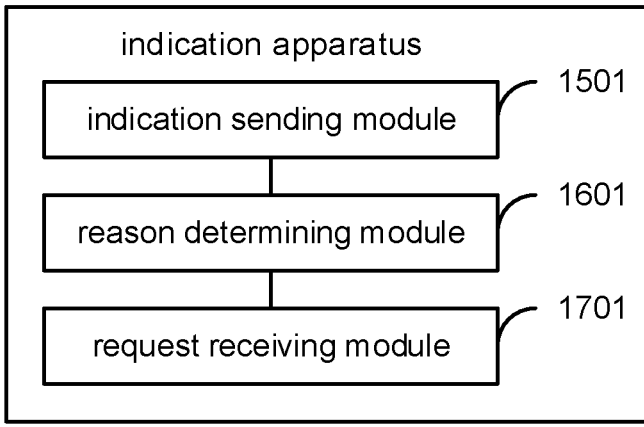
FIG. 17 is a block diagram illustrating yet another indication apparatus according to embodiments of the disclosure.

The technical solutions according to embodiments of the disclosure will be clearly and completely described below with reference to the accompanying drawings in embodiments of the disclosure. Obviously, the described embodiments are only a part of embodiments of the disclosure, but not all of the embodiments. Based on embodiments in the disclosure, all other embodiments obtained by those of ordinary skill in the art without creative efforts shall fall within the protection scope of the disclosure.

Terms used in embodiments of the disclosure are only for the purpose of describing particular embodiments, and are not intended to limit embodiments of the disclosure. As used in embodiments of the disclosure and the appended claims, the singular forms "a" and "the" are intended to include the plural forms as well, unless the context clearly dictates otherwise. It will be understandable that the term "and/or" as used herein refers to and includes any and all possible combinations of one or more of the associated listed items.

It is understandable that although the terms first, second, third, etc. may be used in embodiments of the disclosure to describe various pieces of information, such information should not be limited to these terms. These terms are only used to distinguish the same type of information from each other. For example, without departing from the scope of embodiments of the disclosure, the first information may also be referred to as the second information, and similarly, the second information may also be referred to as the first information. Depending on the context, the word "if" as used herein can be interpreted as "at the time of" or "when" or "in response to determining."

For the purpose of brevity and ease of understanding, the terms "greater than" or "less than", "higher than" or "lower than" are used herein when characterizing the relationship of magnitude. But for those skilled in the art, it is understandable that the term "greater than" also covers the meaning of "greater than or equal to", and "less than" also covers the meaning of "less than or equal to"; the term "greater than" covers "greater than or equal to", and "less than" also covers the meaning of "less than or equal to".

FIG. 1 is a schematic flowchart illustrating an indication method according to embodiments of the disclosure. The indication method according to embodiments may be performed by a first base station. The first base station may communicate with another base station, such as a second base station, or communicate with a terminal, such as a user equipment (UE).

The first base station and the second base station can each be a base station in a communication system selected from a group including, but not limited to, a fourth generation (4G) base station, a 5G base station, and a 6G base station. The terminal is one selected from a group including, but not limited to, communication devices, such as a mobile phone, a tablet computer, a wearable device, a sensor, and an Internet of Things (IoT) device.

In one embodiment, the terminal may be a terminal by which the indication method described in any of subsequent embodiments is performed. The second base station may be a second base station by which the paging control method described in any of subsequent embodiments is performed.

As illustrated in FIG. 1, the indication method may include the following.

In block S101, first indication information is sent to a second base station.

The first indication information is configured to indicate that the terminal paged by the second base station has received a paging from the second base station, but the terminal does not respond to the paging.

In one embodiment, the second base station may page the terminal, for example, by sending a paging signaling to the terminal through broadcasting, unicasting or multicasting. After receiving the paging from the second base station, the terminal may respond to the paging for example by initiating a random access to the second base station, or may not respond to the paging.

According to embodiments of the disclosure, when the first base station determines that the terminal does not respond to the paging from the second base station, the first base station may notify the second base station, through the first indication information, that the terminal has received the paging from the second base station but the terminal does not respond to the paging.

Accordingly, the second base station can determine that the paging has been received by the terminal, and thus there is no problem in the paging process. Therefore, it is unnecessary to perform unnecessary operations, which is beneficial to avoid the waste of resources. For example, the second base station may suspend the paging to the terminal after receiving the first indication information.

FIG. 2 is a schematic flowchart illustrating another indication method according to embodiments of the disclosure. As illustrated in FIG. 2, the first base station communicates with a first Subscriber Identity Module (SIM) card of the terminal, and the second base station pages a second SIM card of the terminal.

Sending the first indication information to the second base station includes the following.

In block S201, the first indication information is sent to the second base station in response to determining, based on second indication information sent by the first SIM card, that the second SIM card has received the paging from the second base station, but the second SIM card does not respond to the paging.

In one embodiment, the terminal may be a multi-card terminal, which means that multiple SIM cards are included in the terminal. The multiple SIM cards include at least a first SIM card and a second SIM card.

It is noteworthy that the first SIM card and the second SIM card do not refer to certain SIM cards, but refer to any two different SIM cards in the terminal. The SIM card in all embodiments of the disclosure includes, but is not limited to, a USIM card, an eSIM card, or the like.

In one embodiment, the terminal may communicate with the first base station through the first SIM card, and communicate with the second base station through the second SIM card.

In a process that the terminal communicates with the first base station through the first SIM card, if the second base station pages the second SIM card, since the response to the paging through the second SIM card will affect the communication between the first SIM card and the first base station, the terminal can judge whether to respond to the paging through the second SIM card as needed, for example according to service information about the communication between the first SIM card and the first base station or according to service information corresponding to the paging received by the second SIM card. The judging manner will be described in following embodiments.

In a case that the terminal determines not to respond to the paging through the second SIM card, the terminal may send the second indication information to the first base station through the first SIM card that is communicating with the first base station, to inform the first base station that the terminal has received the paging from the base station, but the terminal does not respond to the paging.

In this case, since the second SIM card does not respond to the paging from the second base station, the terminal cannot directly communicate with the second base station through the second SIM card. According to embodiments of the disclosure, in the case where the second SIM card cannot communicate directly with the second base station, the first indication information can be sent by first base station to the second base station, such that the second base station knows that the second SIM card paged by the second base station has received the paging from the second base station, but the second SIM card does not respond to the paging. Therefore, it ensures that even if the response from the second SIM card is not received, the second base station will not mistakenly determine that there is a problem in the paging process, thereby avoiding the waste of resources caused by further unnecessary operations.

FIG. 3 is a schematic flowchart illustrating yet another indication method according to embodiments of the disclosure. As illustrated in FIG. 3, the method further includes the following.

In block S301, a reason why the terminal does not respond to the paging is determined according to the second indication information.

The first indication information is configured to indicate the reason why the terminal does not respond to the paging.

In one embodiment, the terminal may further carry the reason why the terminal does not respond to the paging from the second base station in the second indication information. The reason may be a direct reason or an indirect reason. The direct reason includes for example the terminal being communicating with the first base station through the first SIM card. The indirect reason includes for example information about a service of the communication between the first SIM card and the first base station, such as the type of the service, a priority of the service, a data volume of the data to be sent by the service, or the like.

After the first base station receives the second indication information, the first base station can determine the reason why the terminal does not respond to the paging from the second base station, and then can carry the reason in the first indication information sent to the second base station, so that the second base station can know the reason why the terminal does not respond to the paging from the second base station.

FIG. 4 is a schematic flowchart illustrating yet another indication method according to embodiments of the disclosure. As illustrated in FIG. 4, the reason at least includes at least the first SIM card being communicating with the first base station. The method further includes the following.

In block S401, request information sent by the second base station is received. The request information is configured to request the first base station to suspend the communication with the first SIM.

In one embodiment, when the second base station determines that the reason why the terminal does not respond to the paging from the second base station includes that the terminal is communicating with the first base station through the first SIM card, if the second base station still needs to page the second SIM card according to its own needs, the base station can send the request information to the first base station to request the first base station to suspend the communication with the first SIM card.

Accordingly, when the second base station still needs to page the second SIM card, the second base station can request the first base station c to suspend the communication process of the first SIM card, so that the terminal can use the second SIM card to respond to the paging from the second base station.

It is noteworthy that, in all embodiments of the disclosure, the communication between the SIM card and the base station may refer to the communication between a terminal where the SIM card is included and the base station. The terminal can communicate with the base station via the SIM cars as well as a processor and a radio frequency transceiver element of the terminal. The element that directly communicates with the base station can be a radio frequency transceiver element. The the information to be sent by the radio frequency transceiver element can be from the SIM card and the information received by the radio frequency transceiver element can be transmitted to the SIM card first.

For example, the first SIM card communicating with the first base station mentioned in above embodiments means that a terminal where the first SIM card is included communicates with the base station based on the identity of the first SIM card. Similarly, the second SIM card communicating with the second base station means that a terminal where the second SIM card is included communicates with the base station based on the identity of the second SIM card. For example, the second SIM card receiving the paging from the second base station means that a terminal where the second SIM card is includes receives the paging from the second base station.

In one embodiment, the first indication information may further carry service information of the communication between the first SIM card and the first base station. The second base station may determine the service information of a service to be performed by paging the second SIM card. The second base station can compare these two service information, and send the request information to the first base station in response to determining that the service to be performed by paging the second SIM card is more urgent.

Or, the second base station may carry, in the request information, the service information of the service to be performed by the paging the second SIM card in the request information, and the first base station may determine which of the service of the communication with the first SIM card and the service to be performed by paging the second SIM card by the second base station is more urgent. When determining that the service to be performed by paging the second SIM card by the second base station is more urgent, the first base station can instruct the terminal suspend the communication between the first SIM card and the first base station.

In one embodiment, the method further includes:
sending third indication information to the first SIM card.

The third indication information is configured to instruct the first SIM card to suspend the communication with the first base station.

In one embodiment, in response to determining that there is a need to suspend the communication with the first SIM card, the first base station send the third indication information to the first SIM card, in which the third indication information is configured to instruct the first SIM card to suspend the communication with the first base station.

The basis for determining, by the first SIM card, that there is a need to suspend the communication with the first SIM card includes, but is not limited to, that the first SIM card receives the request information from the second base station, or the first SIM card determines that the service to be performed by paging the second SIM card by the second base station is more urgent.

After receiving the third indication information, the terminal can control the first SIM card to suspend the communication with the first base station. For example, the terminal can keep in the connected state and temporarily stop the uplink and downlink communication with the first base station, or the terminal can enter the disconnected state (for example, idle state or inactive state). During the period when the first SIM card suspends the communication with the first base station, the terminal may respond, through the second SIM card, to the paging from the second base station by for example initiating, through the second SIM card, a random access procedure to the second base station.

It is noteworthy that, in all embodiments of the disclosure, the indication function of the indication information on the SIM card will act on the terminal where the SIM card is located.

For example, in above embodiments, the third indication information is configured instruct the first SIM card to suspend the communication with the first base station. In detail, the radio frequency transceiver element may receive the third indication information sent by the base station and sends the third indication information to the first SIM card, the first SIM card in turn sends the third indication information to the processor of the terminal, and the processor of the terminal analyzes and determines the meaning of the third indication information and then controls, based on the meaning of the third indication information, the first SIM card to suspend the communication with the first base station. In this way, the terminal will suspend sending information to the first base station or receiving information from the first base station based on the identity of the first SIM card.

In one embodiment, the method further includes:
receiving relevant information of the paging from the second base station.

In one embodiment, the method further includes:
sending the third indication information to the first SIM card, In response to determining, based on the relevant information, that the first SIM card suspends the communication.

The third indication information is configured to instruct the first SIM card to suspend the communication with the first base station.

In one embodiment, the second base station may send the relevant information of the paging that is sent to the second SIM card to the first base station. For example, the service information of the service to be performed by paging the second SIM card can be sent to the first base station, such that the first base station determines which one of the service of the communication with the first SIM card and the service to be performed by paging the second SIM card by the second base station is more urgent. In response to determining that the service to be performed by paging the second SIM card by the second base station is more urgent, it can be determined that the first SIM card needs to suspend the communication and the third indication information is sent to the first SIM card to instruct the terminal to control the first SIM card to suspend the communication with the first base station.

It is noteworthy that after receiving the third indication information, the terminal can suspend the communication between the first SIM card and the first base station, and can further choose to respond, through the second SIM card, to the paging from the second base station or choose to perform an operation other than responding, through the second SIM card, to the paging from the second base station.

If the first base station clearly indicates, through the third indication information, that not only the terminal needs to suspend the communication between the first SIM card and the first base station, but also the terminal needs to respond, through the second SIM card, to the paging from the second base station, then after suspending the communication between the first SIM card and the first base station, the terminal further needs to respond, through the second SIM card, to the paging from the second base station.

FIG. 5 is a schematic flowchart illustrating yet another indication method according to embodiments of the disclosure. As illustrated in FIG. 5, the method further includes the following.

In block S501, a duration during which the terminal does not respond to the paging is determined based on the second indication information.

The first indication information is further configured to indicate the duration during which the terminal does not respond to the paging.

In one embodiment, the second indication information may also carry the duration during which the terminal does not respond to the paging from the second base station, so that the first base station may carry the duration in the first indication information and send the first indication information to the second base station. In this way, the second base station can determine that there is no need to page the terminal during this time period.

It is noteworthy that, in addition to carrying the duration in the second indication information, the duration may also be determined by the first base station. For example, the duration is determined by the first base station based on a condition of the communication between the first base station and the first SIM card. In detail, the first base station may determine a time required to complete the communication with the first SIM card as the duration.

FIG. 6 is a schematic flowchart illustrating yet another indication method according to embodiments of the disclosure. As illustrated in FIG. 6, the method further includes the following.

In block S601, the first indication information is sent to a core network corresponding to the second base station.

In one embodiment, the operation that the second base station pages the terminal is generally triggered by the core network. For example, if the core network needs to page the second SIM card in the terminal, the core network determines all base stations within the tracking area of the second SIM card, and then send an instruction for paging the second SIM card to these base stations. After receiving the instruction from the core network, the second base station will start to page the second SIM card.

According to embodiments of the disclosure, the first base station can not only send the first indication information to the second base station, but also can send the first indication information to the core network corresponding to the second base station, i.e., the core network that triggers the second base station to page the terminal, such that the core network determines that the terminal has received the paging from the second base station, but the terminal does not respond to the paging.

In this way, it is possible to avoid misoperations, such as updating the tracking area, performed by the core network since the core network determines that there is a problem in the paging process when the terminal does not respond to the paging, which is beneficial to avoid the waste of resources.

FIG. 7 is a schematic flowchart illustrating a paging control method according to embodiments of the disclosure. The paging control method according to embodiments may be performed by a second base station. The second base station may communicate with another base station, such as the first base station, or communicate with a terminal, such as a UE.

The first base station and the second base station each is a base station in a communication system selected from a group including, but not limited to, a 4G base station, a 5G base station, and a 6G base station. The terminal is one selected from a group including, but not limited to, communication devices, such as a mobile phone, a tablet computer, a wearable device, a sensor, and an IoT device.

In one embodiment, the terminal may be a terminal by which the indication method according to any one of subsequent embodiments is performed. The first base station may be the first base station by which the indication method according to any of the foregoing embodiments is performed.

As illustrated in FIG. 7, the paging control method may include the following.

In block S701, the first indication information sent by the first base station is received.

In block S702, a paging to a terminal is suspended, in response to determining, based on the first indication information, that the terminal has received the paging from the second base station, but the terminal does not respond to the paging.

In one embodiment, the second base station may page the terminal. For example, the second base station pages the terminal by sending a paging signaling to the terminal through broadcasting, unicasting, or multicasting. After receiving the paging from the second base station, the terminal may respond to the paging, for example by initiating a random access procedure to the second base station, or may not respond to the paging.

According to embodiments of the disclosure, when the first base station determines that the terminal does not respond to the paging from the second base station, the first base station may notify, through the first indication information, the second base station that the terminal has received the paging from the second base station but the terminal does not respond to the paging.

Accordingly, the second base station can determine that there is no problem in the paging process since the terminal has received the paging, and it is unnecessary to perform any unnecessary operations, which is beneficial to avoid the waste of resources. For example, the second base station may suspend paging the terminal after receiving the first indication information.

FIG. 8 is a schematic flowchart illustrating another paging control method according to embodiments of the disclosure. As illustrated in FIG. 8, the method further includes the following.

In block S801, a reason why the terminal does not respond to the paging is determined based on the first indication information.

In one embodiment, the first base station may determine the reason why the terminal does not respond to the paging from the second base station, carry the reason in the first indication information and send the first indication information carrying the reason to the second base station. In this way, the second base station knows the reasons why the terminal does not respond to the paging from the second base station.

For example, the terminal may send second indication information to the first base station, in which the second indication information may carry the reason why the terminal does not respond to the paging from the second base station. The reason may be a direct reason or an indirect reason. The direct reason is for example the terminal being communicating with the first base station through the first SIM card. The indirect reasons is for example the service information of the communication between the first SIM card and the first base station. The service information is for example the type of the service, the priority of the service, the data volume of the data to be sent by the service, or the like.

After receiving the second indication information, the first base station can determine the reason why the terminal does not respond to the paging from the second base station, and then can carry the reason in the first indication information sent to the second base station, so that the second base station can know the reason why the terminal does not respond to the paging from the second base station.

FIG. 9 is a schematic flowchart illustrating yet another paging control method according to embodiments of the disclosure. As illustrated in FIG. 9, the method further includes the following.

In bock S901, request information is sent to the first base station, in response to the reason at least including the first SIM card is communicating with the first base station.

The request information is configured to request the first base station to instruct the first SIM card to suspend the communication.

In one embodiment, when the second base station determines that the reason why the terminal does not respond to the paging from the second base station includes that the terminal is communicating with the first base station through the first SIM card, if the second base station still needs to page the second SIM card according to its own needs, the second base station sends the request information to the first base station, to request the first base station to suspend the communication with the first SIM card.

Accordingly, when the second base station still needs to page the second SIM card, the second base station can request the first base station to suspend the communication process of the first SIM card, so that the terminal can respond, through the second SIM card, to the paging from the second base station.

In one embodiment, the first indication information may further carry the service information of the communication between the first SIM card and the first base station. The second base station may determine the service information of the service to be performed by paging the second SIM card, compare these two service information, and send the request information to the first base station in response to determining that the service to be performed by paging the second SIM card is more urgent.

Or, the second base station may carry, in the request information, the service information of the service to be performed by the paging the second SIM card, and the first base station may determine which one of the service of the communication with the first SIM card and the service to be performed by paging the second SIM card by the second base station is more urgent. When the first base station determines that the service to be performed by paging the second SIM card by the second base station for paging the second SIM card is more urgent, the first base station can instruct the terminal to suspend the communication between the first SIM card and the first base station.

In one embodiment, the method further includes:

continuing to paging the terminal, in response to determining, based on response information from the first base station, that the first SIM card suspends the communication with the first base station.

In one embodiment, when the first base station determines that the communication with the first SIM card needs to be suspended, the first base station may send the third indication information to the first SIM card, to instruct, through the third indication information, the first SIM card to suspend the communication with the first base station. Further, the first base station can send the response information the second base station to inform the second base station that the first base station has instructed the terminal to stop the communication between the first SIM card and the first base station. Therefore, the second SIM card can continue to page the terminal, for example, continue to page the second SIM card in the terminal.

FIG. 10 is a schematic flowchart illustrating yet another paging control method according to embodiments of the disclosure. As illustrated in FIG. 10, the method for suspending a paging to a terminal includes the following.

In block S1001, a duration during which the terminal does not respond to the paging is determined based on the first indication information.

In block S1002, a paging to the terminal is suspended within the duration.

In one embodiment, the first base station may determine the duration during which the terminal does not respond to the paging from the second base station, carry the duration in the first indication information, and send the first indication information carrying the duration to the second base station. Therefore, the second base station knows the duration during which the terminal does not respond to paging from the second base station.

For example, the second indication information sent by the terminal to the first base station may carry the duration during which the terminal does not respond to the paging from the second base station, so that the first base station may carry the duration in the first indication information and send the first indication information carrying the duration to the second base station.

After determining the duration, the second base station may suspend the paging to the terminal at least within the duration, so as to avoid the waste of resources required by the second base station to continue to page the terminal within the duration.

FIG. 11 is a schematic flowchart illustrating yet another paging control method according to embodiments of the disclosure. As illustrated in FIG. 11, the method further includes the following.

In block S1101, fourth indication information is sent to a core network that triggers the second base station to page the terminal.

The fourth indication information is configured to indicate that the terminal paged by the second base station has received the paging from the second base station, but the terminal does not respond to the paging.

In one embodiment, the operation that the second base station pages the terminal is generally triggered by the core network. For example, if the core network needs to page the second SIM card in the terminal, the core network will determine all base stations within the tracking area of the second SIM card and send an instruction for paging the second SIM card to these base stations. The second base station will start to page the second SIM card after receiving the instruction from the core network.

According to embodiments of the disclosure, when the second base station determines that the terminal has received the paging from the second base station, but the terminal does not respond to the paging, the second base station may send the fourth indication information to the core network to inform the core network that the terminal paged by the second base station has received the paging from the second base station, but the terminal does not respond to the paging.

Accordingly, it is possible to avoid misoperations, such as updating the tracking area, performed by the core network since the core network determines that there is a problem in the paging process when the terminal does not respond to the paging, which is beneficial to avoid the waste of resources.

FIG. 12 is a schematic flowchart illustrating an indication method according to embodiments of the disclosure. The indication method according to embodiments can be performed by a terminal. When the terminal is a multi-card terminal, the terminal can include multiple SIM cards. The multiple SIM cards at least include a first SIM card and a second SIM card.

The terminal may communicate with the first base station or with the second base station. For example, the terminal may communicate with the first base station through the first SIM card included in the terminal, and communicate with the second base station through the second SIM card included in the terminal.

The first base station and the second base station each is a base station in a communication system selected from a group including, but not limited to, a 4G base station, a 5G base station, and a 6G base station. The terminal is one selected from a group including, but not limited to, communication devices, such as a mobile phone, a tablet computer, a wearable device, a sensor, and an IoT device.

In an embodiment, the first base station may be a first base station by which the indication method according to any of foregoing embodiments is performed. The second base station may be a second base station by which the paging control method according to any of foregoing embodiments is performed.

As illustrated in FIG. 12, the indication method may include the following.

In block S1201, during a communication between the first SIM card and the first base station, the second SIM card receives a paging from the second base station.

In block S1202, second indication information is sent to the first base station through the first SIM card, in response to determining not to respond to the paging.

The second indication information is configured to indicate that the terminal has received the paging, but the terminal does not respond to the paging.

In one embodiment, during the communication between the terminal and the first base station through the first SIM card, if the second base station pages the second SIM card, the response to the paging through the second SIM card will affect the communication between the first SIM card and the first base station. Therefore, the terminal can determine whether to respond, through the second SIM card, to the paging as needed. For example, the terminal can make this judgement based on the service information of the communication between the first SIM card and the first base station, or the service information of a service corresponding to the paging received by the second SIM card. The specific judgment method will be described in following embodiments.

In the case that the terminal determines not to respond to the paging through the second SIM card, the terminal may send the second indication information to the first base station through the first SIM card that is communicating with the first base station, to inform the first base station that the terminal has received the paging from the second base station, but the terminal does not respond to the paging.

In this case, since the second SIM card does not respond to the paging from the second base station, the terminal cannot directly communicate with the second base station through the second SIM card. According to embodiments of the disclosure, in the case where the second SIM card cannot communicate directly with the second base station, the first indication information can be sent by first base station to the second base station, so that the second base station knows that the second SIM card paged by the second base station has received the paging from the second base station, but the second SIM card does not respond to the paging. Therefore, it ensures that even if the response from the second SIM card is not received, the second base station will not mistakenly determine that there is a problem in the paging process, thereby avoiding the waste of resources caused by further unnecessary operations.

In one embodiment, the second indication information is further configured to indicate at least one of the following:

information of the second SIM card;
information of the second base station;
a reason for not responding to the page; or
a duration of not responding to the page.

The information of the second SIM card may be, for example, an identifier of the second SIM card or a service corresponding to the paging received by the second SIM card. The information of the second base station may be, for example, an identifier of the second base station.

The first base station can determine, based on the information of the second SIM card and the information of the second base station, that it needs to send the first indication information to the second base station, and informs, through the first indication information, the second base station that the second SIM card has received the paging, but the second SIM card does not respond to the paging, such that the second base station suspends the paging to the second SIM card without suspending the paging to other SIM cards.

Certainly, if the second indication information does not include any information of the second SIM card or any information of the second base station, the first base station can also determine that it needs to send the first indication information to the second base station in other ways, for example, according to the historical communication record of the terminal.

In one embodiment, it is determined to not respond to the paging based on at least one of the following:

service information of the communication between the first SIM card and the first base station; or
service information of the service corresponding to the paging.

In one embodiment, the basis for determining, by the terminal, not to respond to the paging from the second base station may be configured by the core network. For example, the basis is configured for the terminal through a signaling other than an access-layer signaling, the basis is configured by the base station through such as a radio control access-layer signaling, or the basis can be determined by the terminal based on its own implementation.

It is noteworthy that the basis includes, but is not limited to, the above two situations, and there may also be various specific service information, such as the priority of the service, the identifier of the service, the service quality of the service, or the like.

For example, the service information includes the priority of the service. The terminal can compare the priorities of two services, and determine not to respond to the paging in response to the priority of the service of the communication between the first SIM card and the first base station is higher.

For example, the service information includes the identifier of the service identifier. The terminal can only determine, based on the identifier of the service, whether the service of the communication between the first SIM card and the first base station is a specific service and determine not to respond to the paging in response to the service being a specific service.

FIG. 13 is a schematic flowchart illustrating another indication method according to embodiments of the disclosure. As illustrated in FIG. 13, the method further includes the following.

In block S1301, the third indication information sent, through the first SIM card, by the first base station is received.

In block S1302, the communication between the first SIM card and the first base station is suspended based on the third indication information.

In block S1303, the paging is responded to through the second SIM card.

In one embodiment, when the second base station determines that the reason why the terminal does not respond to the paging from the second base station includes that the terminal is communicating with the first base station through the first SIM card, if the second base station still needs to page the second SIM card based on its own needs, the second base station may send request information to the first base station, to request the first base station to suspend the communication with the first SIM card.

The first base station can determine, based on its own needs, whether to suspend the communication with the first SIM card. If it is determined that the communication with the first SIM card needs to be suspended, the first base station can send the third indication information to the first SIM card, to instruct, through the third indication information, the first SIM card to suspend the communication with the first base station. In this case, the terminal may suspend the communication between the first SIM card and the first base station, and then respond, through the second SIM card, to the paging.

FIG. 14 is a schematic flowchart illustrating yet another indication method according to embodiments of the disclosure. As illustrated in FIG. 14, responding, through the second SIM card, to the paging includes the following.

In block S1401, the paging is responded to through the second SIM card, in response to receiving by the second SIM card the paging after the communication between the first SIM card and the first base station is suspended.

In one embodiment, after the communication between the first SIM card and the first base station is suspended, if the terminal receives, through the second SIM card, the paging from the second base station, the terminal may respond, through the second SIM card, to the paging. However, if the paging from the second base station is not received, the terminal may choose not to respond to the previously received paging.

It is noteworthy that the steps performed by the first base station and the second base station in above embodiments are applicable to both base stations. For example, if during the communication between the second base station and the second SIM card, the first base station pages the first SIM card and the terminal decides not to respond to the paging from the first base station, then the first base station can perform the steps performed by the second base station and the second base station can perform the steps performed by the first base station. Correspondingly, operations performed by the first SIM card and operations performed by the second SIM card can be interchanged.

Corresponding to the foregoing embodiments of the indication method and the paging control method, the disclosure provides embodiments of an indication apparatus and a paging control apparatus.

FIG. 15 is a block diagram illustrating an indication apparatus according to embodiments of the disclosure. The indication apparatus illustrated in embodiments may be applied to a first base station. The first base station may communicate with another base station, such as a second base station, or communicate with a terminal serving as the UE The first base station and the second base station each is a base station in a communication system selected from a group including, but not limited to, a 4G base station, a 5G base station, and a 6G base station. The terminal is one selected from a group including, but not limited to, communication devices, such as a mobile phone, a tablet computer, a wearable device, a sensor, and an IoT device.

As illustrated in FIG. 15, the indication apparatus may include an indication sending module 1501.

The indication sending module 1501 is configured to send first instruction information to the second base station.

The first indication information is configured to indicate that the terminal paged by the second base station has received a paging from the second base station, but the terminal does not respond to the paging.

In one embodiment, the first base station communicates with a first SIM card in the terminal, the second base station pages a second SIM card in the terminal.

The indication sending module is configured to, send the first indication information to the second base station, in response to determining, based on second indication information sent by the first SIM card, that the second SIM card has received the paging from the second base station, but the second SIM card does not respond to the paging.

FIG. 16 is a block diagram illustrating another indication apparatus according to embodiments of the disclosure. As illustrated in FIG. 16, the apparatus further includes a reason determining module 1601.

The reason determining module 1601 is configured to determine, based on the second indication information, a reason why the terminal does not respond to the paging.

The first indication information is further configured to indicate the reason why the terminal does not respond to the paging.

FIG. 17 is a block diagram illustrating yet another indication apparatus according to embodiments of the disclosure. As illustrated in FIG. 17, the reason at least includes that the first SIM card is communicating with the first base station. The apparatus further includes a request receiving module 1701.

The request receiving module 1701 is configured to receive request information sent by the second base station, in which the request information is configured to request the first base station to suspend the communication with the first SIM card.

Figure 18:
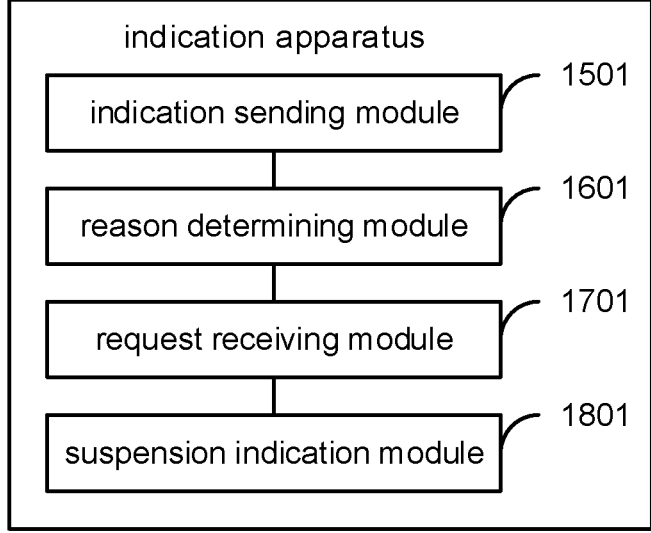
FIG. 18 is a block diagram illustrating yet another indication apparatus according to embodiments of the disclosure.

FIG. 18 is a block diagram illustrating yet another indication apparatus according to embodiments of the disclosure. As illustrated in FIG. 18, the apparatus further includes a suspension indication module 1801.

The suspension indication module 1801 is configured to send third indication information to the first SIM card.

The third indication information is configured to instruct the first SIM card to suspend the communication with the first base station.

Figure 19:
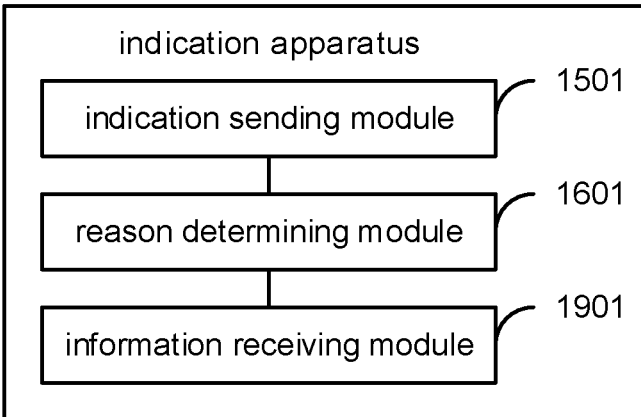
FIG. 19 is a block diagram illustrating yet another indication apparatus according to embodiments of the disclosure.

FIG. 19 is a schematic block diagram illustrating yet another indication apparatus according to embodiments of the disclosure. As illustrated in FIG. 19, the apparatus further includes an information receiving module 1901.

The information receiving module 1901 is configured to receive relevant information of the paging sent by the second base station.

Figure 20:
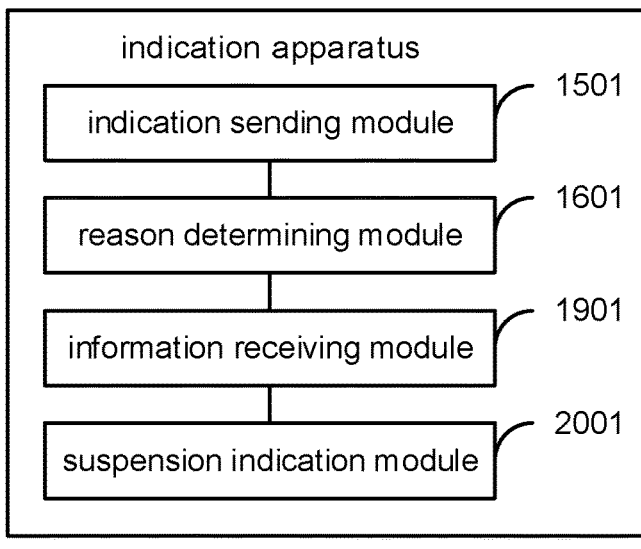
FIG. 20 is a block diagram illustrating yet another indication apparatus according to embodiments of the disclosure.

FIG. 20 is a block diagram illustrating yet another indication apparatus according to embodiments of the disclosure. As illustrated in FIG. 20, the apparatus further includes a suspension indication module 2001.

The suspension indication module 2001 is configured to send third indication information to the first SIM card, in response to determining, based on the relevant information, that the first SIM card suspends the communication.

The third indication information is configured to instruct the first SIM card to suspend the communication with the first base station.

Figure 21:
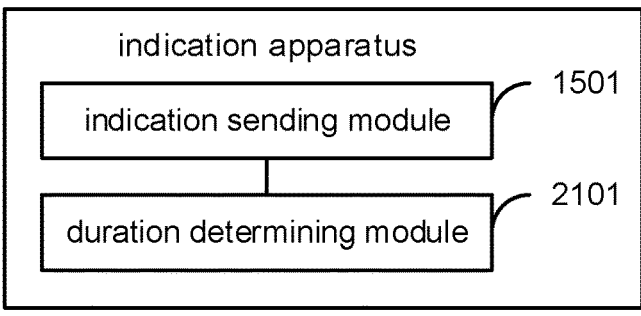
FIG. 21 is a block diagram illustrating yet another indication apparatus according to embodiments of the disclosure.

FIG. 21 is a block diagram illustrating yet another indication apparatus according to embodiments of the disclosure. As illustrated in FIG. 21, the apparatus further includes a duration determining module 2101.

The duration determining module 2101 is configured to determine, based on the second indication information, a duration during which the terminal does not respond to the paging.

The first indication information is further configured to indicate the duration during which the terminal does not respond to the paging.

Figure 22:
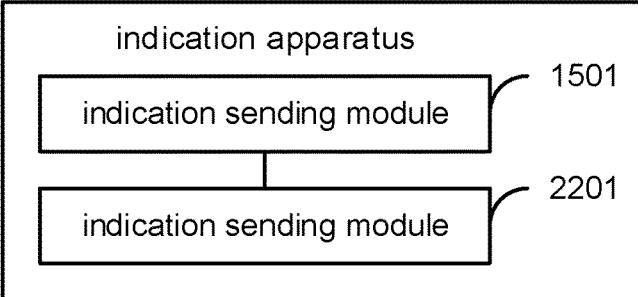
FIG. 22 is a block diagram illustrating yet another indication apparatus according to embodiments of the disclosure.

FIG. 22 is a block diagram illustrating yet another indication apparatus according to embodiments of the disclosure. As illustrated in FIG. 22, the apparatus further includes an indication sending module 2201.

The indication sending module 2201 is configured to send the first indication information to a core network corresponding to the second base station.

Figure 23:
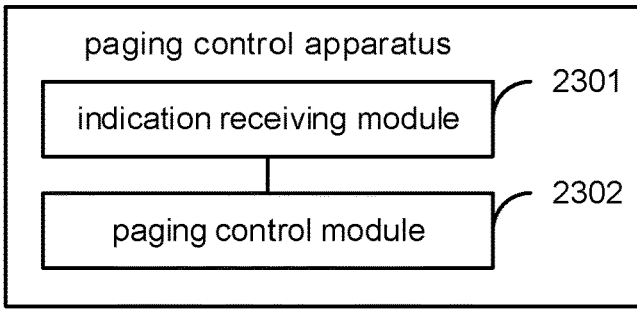
FIG. 23 is a block diagram illustrating a paging control apparatus according to embodiments of the disclosure.

FIG. 23 is a block diagram illustrating a paging control apparatus according to embodiments of the disclosure. The paging control apparatus according to embodiments may be applied to a second base station. The second base station may communicate with another base station, such as the first base station, or communicate with a terminal serving as the UE.

The first base station and the second base station each is a base station in a communication system selected from a group including, but not limited to, a 4G base station, a 5G base station, and a 6G base station. The terminal is one selected from a group including, but not limited to, communication devices, such as a mobile phone, a tablet computer, a wearable device, a sensor, and an IoT device.

As illustrated in FIG. 23, the paging control apparatus may include an indication receiving module 2301 and a paging control module 2302.

The indication receiving module 2301 is configured to receive the first instruction information sent by the first base station.

The paging control module 2302 is configured to suspend a paging to the terminal, in response to determining, based on the first indication information, that the terminal has received the paging from the second base station, but the terminal does not respond to the paging.

Figure 24:
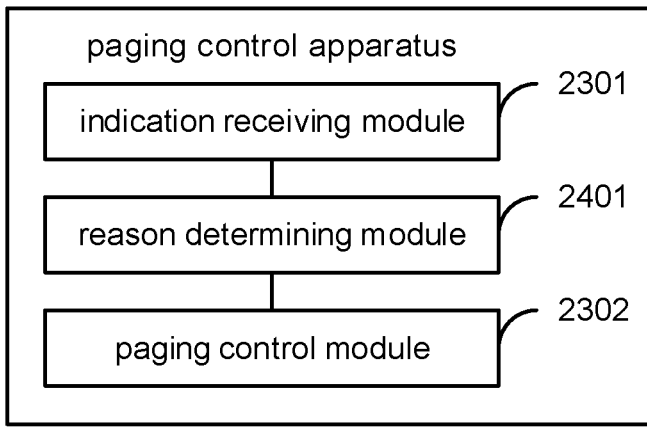
FIG. 24 is a block diagram of another paging control apparatus according to embodiments of the disclosure.

FIG. 24 is a block diagram illustrating another paging control apparatus according to embodiments of the disclosure. As illustrated in FIG. 24, the apparatus further includes a reason determining module 2401.

The reason determining module 2401 is configured to determine, based on the first indication information, the reason why the terminal does not respond to the paging.

Figure 25:
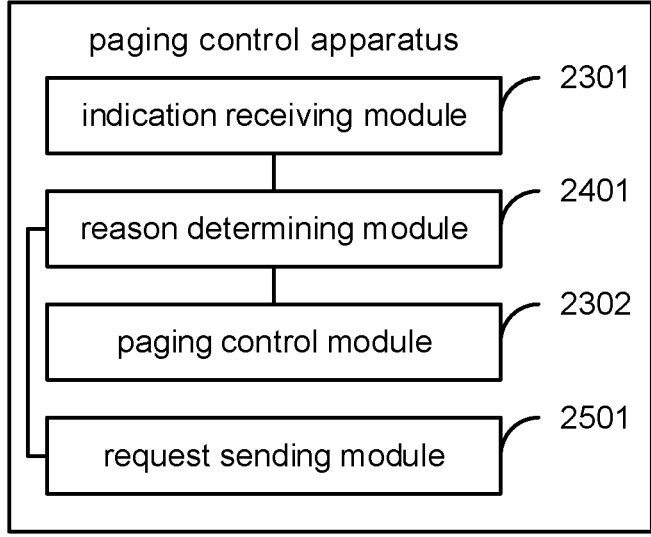
FIG. 25 is a block diagram illustrating yet another paging control apparatus according to embodiments of the disclosure.

FIG. 25 is a block diagram illustrating yet another paging control apparatus according to embodiments of the disclosure. As illustrated in FIG. 25, the apparatus further includes a request sending module 2501.

The request sending module 2501 is configured to send request information to the first base station, in response to the reason at least including that the first SIM card is communicating with the first base station.

The request information is configured to request the first base station to instruct the first SIM card to suspend the communication.

In one embodiment, the paging control module is further configured to continue paging the terminal in response to determining, based on response information from the first base station, that the first SIM card suspends the communication with the first base station.

In one embodiment, the paging control module is configured to determine, based on the first indication information, a duration during which the terminal does not respond to the paging; and suspend the paging to the terminal within the duration.

Figure 26:
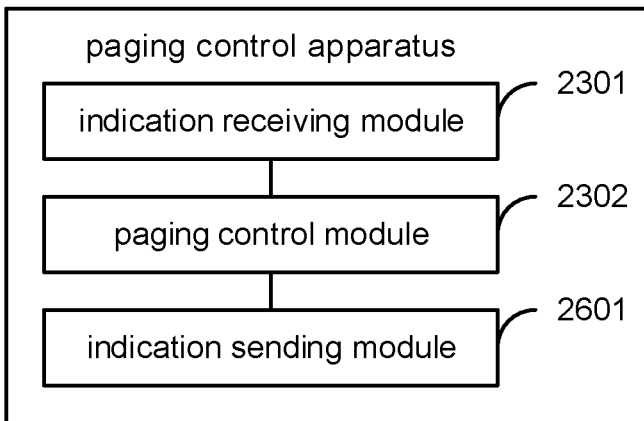
FIG. 26 is a block diagram illustrating yet another paging control apparatus according to embodiments of the disclosure.

FIG. 26 is a block diagram illustrating yet another paging control apparatus according to embodiments of the disclosure. As illustrated in FIG. 26, the apparatus further includes an indication sending module 2601.

The indication sending module 2601 is configured to send fourth indication information to the core network that triggers the second base station to page the terminal.

The fourth indication information is configured to indicate that the terminal paged by the second base station has received the paging from the second base station, but the terminal does not respond to the paging.

Figure 27:
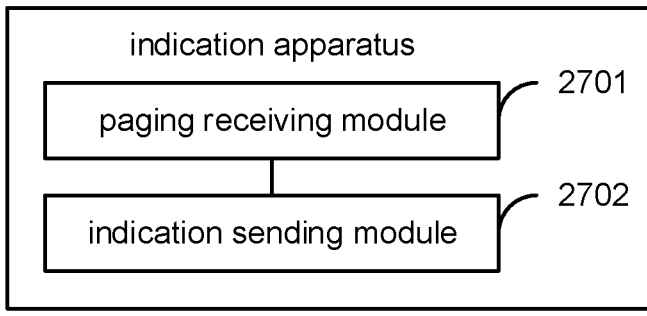
FIG. 27 is a block diagram illustrating an indication apparatus according to embodiments of the disclosure.

FIG. 27 is a block diagram illustrating an indication apparatus according to embodiments of the disclosure. The indication apparatus according to embodiments may be applied to a terminal. When the terminal is a multi-card terminal, multiple SIM cards may be set in the terminal. The multiple SIM cards at least include a first SIM card and a second SIM card.

The terminal may communicate with the first base station and also with the second base station. For example, the terminal may communicate with the first base station through the first SIM card in the terminal, and communicate with the second base station through the second SIM card in the terminal.

As illustrated in FIG. 27, the indication apparatus may include a paging receiving module 2701 and an indication sending module 2702.

The paging receiving module 2701 is configured to receive, through the second SIM card, the paging from the second base station during the communication between the first SIM card and the first base station.

The indication sending module 2702 is configured to send, through the first SIM card, second indication information to the first base station, in response to determining not to respond to the paging.

The second indication information is configured to indicate that the terminal has received the paging, but the terminal does not respond to the paging.

In one embodiment, the second indication information is further configured to indicate at least one of the following:
information of the second SIM card;
information of the second base station;
a reason for not responding to the paging; or
a duration during which the paging is not responded to.

In one embodiment, determining not to respond to the paging is based on at least one of the following:
service information of the communication between the first SIM card and the first base station; or
service information corresponding to the paging.

Figure 28:
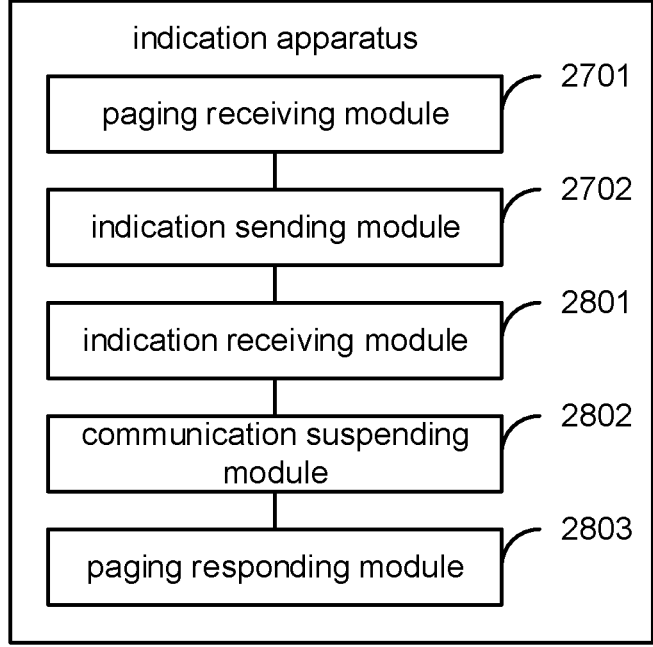
FIG. 28 is a block diagram illustrating another indication apparatus according to embodiments of the disclosure.

FIG. 28 is a block diagram illustrating another indication apparatus according to embodiments of the disclosure. As illustrated in FIG. 28, the apparatus further includes an indication receiving module 2801, a communication suspending module 2802 and a paging responding module 2803.

The indication receiving module 2801 is configured to receive, through the first SIM card, the third instruction information sent by the first base station.

The communication suspending module 2802 is configured to suspend the communication between the first SIM card and the first base station based on the third indication information;

The paging responding module 2803 is configured to respond, through the second SIM card, to the paging.

In one embodiment, the paging responding module is configured to response, through the second SIM card, to the paging in response to receiving, by the second SIM card, the paging after the communication between the first SIM card and the first base station is suspended.

Regarding the apparatuses in the foregoing embodiments, the specific manners in which each module performs operations have been described in detail in the embodiments of the related methods, and will not be described in detail here.

For the apparatus embodiments, since they basically correspond to the method embodiments, reference may be made to the partial descriptions of the method embodiments for related parts. The device embodiments described above are only illustrative, in which the modules described as separate components may or may not be physically separated, and the components shown as modules may or may not be physical modules, that is, they may be located in the same place, or distributed over multiple network modules. Some or all of the modules may be selected according to actual needs to achieve the purpose of the solution according to embodiments of the disclosure. Those of ordinary skill in the art can understand and implement the disclosure without creative effort.

Embodiments of the disclosure also provide a communication device, including:

a processor; and a memory for storing a computer program.

When the computer program is executed by the processor, the indication method performed by the first base station according to any of the foregoing embodiments is performed.

Embodiments of the disclosure further provide a communication device, including:

a processor; and a memory for storing a computer program.

When the computer program is executed by the processor, the paging control method according to any of the foregoing embodiments is performed.

Embodiments of the disclosure further provide a communication device, including:

a processor; and a memory for storing a computer program.

When the computer program is executed by the processor, the indication method performed by the terminal according to any of the foregoing embodiments is performed.

Embodiments of the disclosure further provide a computer-readable storage medium having a computer program stored thereon. When the computer program is executed by a processor, the indication method performed by the first base station according to any of the foregoing embodiments is performed.

Embodiments of the disclosure further provide a computer-readable storage medium, having a computer program stored thereon. When the computer program is executed by a processor, the paging control method according to any of the foregoing embodiments is performed.

Embodiments of the disclosure further provide a computer-readable storage medium, having a computer program stored thereon. When the computer program is executed by a processor, the indication method performed by a terminal according to any of the foregoing embodiments is performed.

Figure 29:
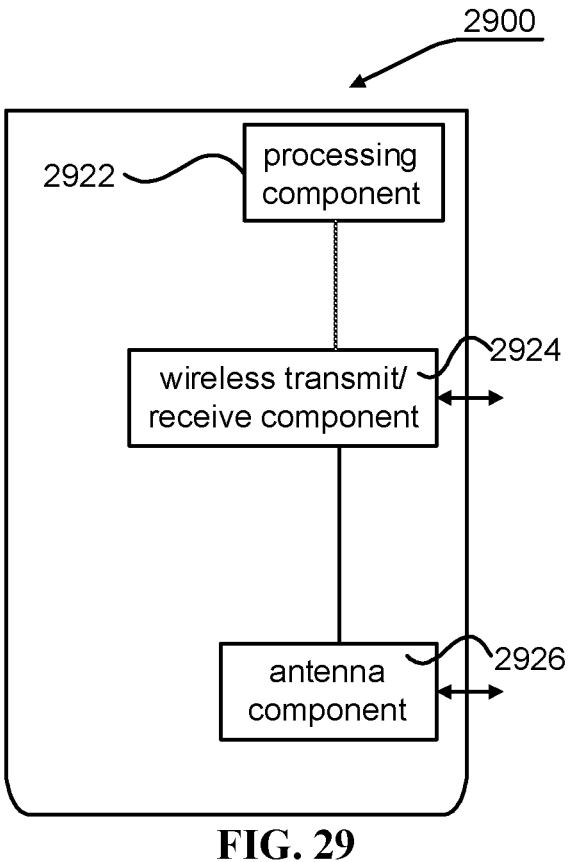
FIG. 29 is a block diagram illustrating an indication device and/or a paging control device according to embodiments of the disclosure.

As illustrated in FIG. 29, FIG. 29 is a block diagram illustrating an indication device 2900 or a paging control device 2900 according to embodiments of the disclosure. The apparatus 2900 may be provided as a base station, e.g., a first base station or a second base station. As illustrated in FIG. 29, the device 2900 includes a processing component 2922, a wireless transmit/receive component 2924, an antenna component 2926, and a signal processing portion specific to a wireless interface. The processing component 2922 may further include one or more processors. One of the processors in the processing component 2922 may be configured to perform the indication method performed by the first base station according to any of the foregoing embodiments and/or the paging control method according to any of the foregoing embodiments.

Figure 30:
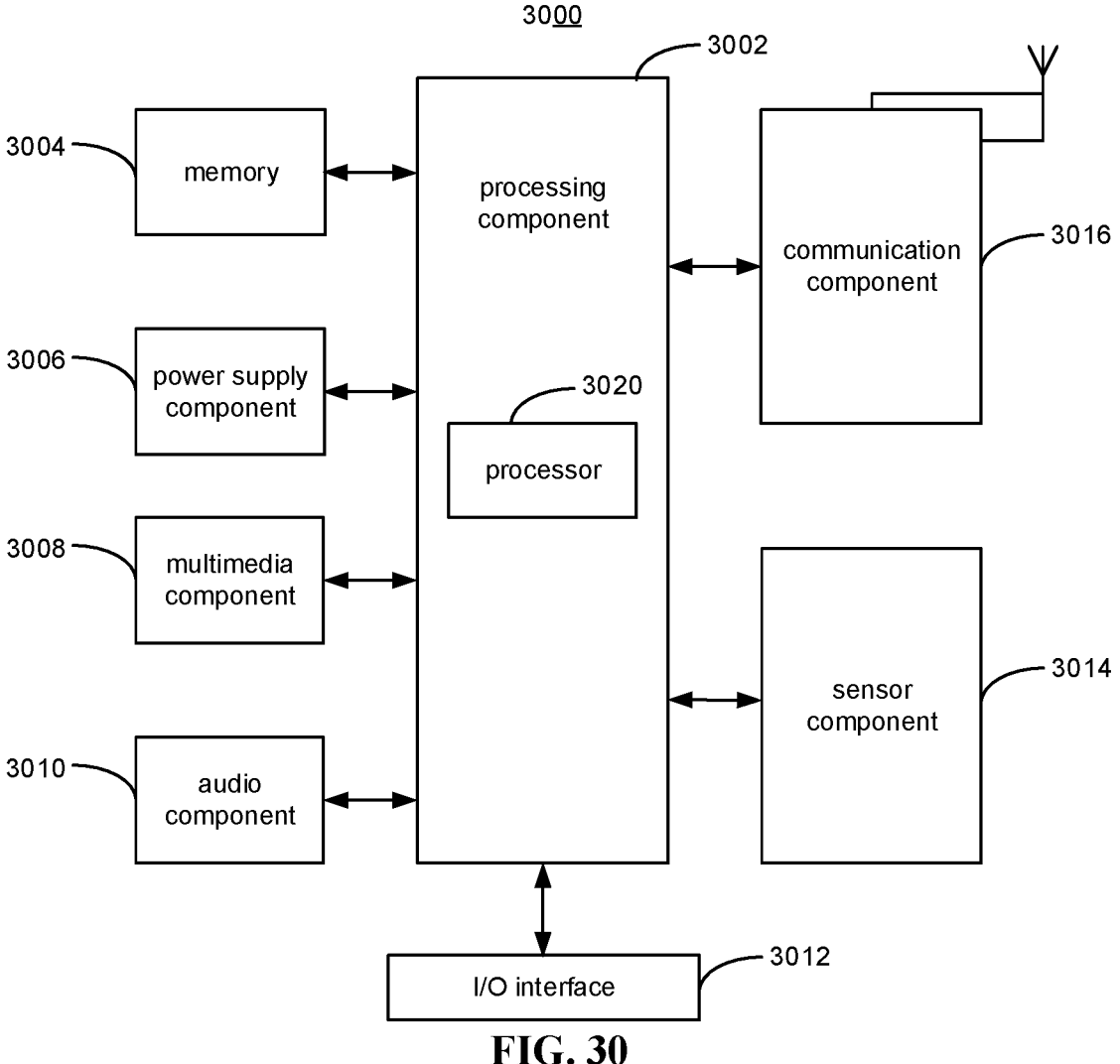
FIG. 30 is a block diagram illustrating an indication device according to embodiments of the disclosure

FIG. 30 is a block diagram illustrating an indication device 3000 according to embodiments of the disclosure. For example, the device 3000 may be a mobile phone, a computer, a digital broadcast terminal, a messaging device, a game console, a tablet device, a medical device, a fitness device, a personal digital assistant, or the like.

As illustrated in FIG. 30, the device 3000 may include one or more of the following components: a processing component 3002, a memory 3004, a power supply component 3006, a multimedia component 3008, an audio component 3010, an input/output (I/O) interface 3012, a sensor component 3014, or a communication component 3016.

The processing component 3002 typically controls overall operations of the device 3000, such as the operations associated with display, telephone calls, data communications, camera operations, and recording operations. The processing component 3002 may include one or more processors 3020 to perform all or part of the steps of the above described indication method performed by the terminal. Moreover, the processing component 3002 may include one or more modules which facilitate the interaction between the processing component 3002 and other components. For example, the processing component 3002 may include a multimedia module to facilitate the interaction between the multimedia component 3008 and the processing component 83002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of wakeup time and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a Complementary Metal Oxide Semiconductor (CMOS) or Charge-Coupled Device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as Wi-Fi, 2G or 3G, 4G LTE, 5G NR, or a combination thereof. In an embodiment, the communication component 3016 receives a broadcast signal or broadcast associated information from an external broadcast management system via a broadcast channel. In an embodiment, the communication component 3016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In embodiments, the DEVICE 3000 may be implemented with at least one Application Specific Integrated Circuit (ASIC), Digital Signal Processor (DSP), Digital Signal Processing Device (DSPD), Programmable Logic Device (PLD), Field Programmable Gate Array (FPGA), controller, micro-controller, microprocessor or other electronic components, for performing the above described INDICATION method performed by the terminal.

In embodiments, there is also provided a non-transitory computer readable storage medium including executable instructions, such as the memory 3004, executable by the processor 3020 in the device 3000, for performing the above indication method performed by the terminal. For example, the non-transitory computer-readable storage medium may be a ROM, a Random Access Memory (RAM), a CD-ROM, a magnetic tape, a floppy disc, and an optical data storage device.

According to embodiments of the disclosure, when the first base station determines that the terminal does not respond to the paging from the second base station, the first base station may notify the second base station, through the first indication information, that the terminal has received the paging from the second base station, but the terminal does not respond to the paging.

In this way, the second base station can determine that the paging has been received by the terminal and thus there is no problem in the paging process. Therefore, it is unnecessary to perform unnecessary operations, which is beneficial to avoid waste of resources. For example, the second base station may suspend paging the terminal after receiving the first indication information.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It is noteworthy that, in the disclosure, relational terms such as first and second are only used to distinguish one entity or operation from another entity or operation, and do not necessarily require or imply that the relationship between these entities or operations or the sequence of these entities or operations are based on the relation indicated by these relational terms. The terms "comprising", "including" or any other variation thereof are intended to encompass non-exclusive inclusion such that a process, a method, a thing or a device including a list of elements includes not only those elements, but also other elements that are not expressly listed, or also include elements inherent to such the process, the method, the thing or the device. Without further limitation, an element defined by the phrase "comprising a . . . " does not preclude the presence of additional identical elements in the process, the method, the thing or the device that includes the element.

The methods and devices according to embodiments of the disclosure have been described in detail above, and specific examples are used to illustrate the principles and implementations of the disclosure. The description of the above embodiments are only used to help person to well understand the method and principle thoughts of the disclosure. At the same time, for those of ordinary skill in the art, according to the idea of the disclosure, there will be changes in the specific implementation and application scope. In summary, the content of this specification should not be construed as a limitation to the disclosure.

What is claimed is:

1. An indication method, performed by a first base station, wherein the first base station performs a communication with a first Subscriber Identity Module (SIM) card of a terminal paged by a second base station, and the second base station pages a second SIM card of the terminal, wherein the method comprises:

sending first indication information to thea second base station, in response to determining, based on second indication information sent by the first SIM card, that the second SIM card has received a paging from the second base station, but the second SIM card does not respond to the paging;

wherein the first indication information is configured to indicate that athe terminal paged by the second base station has received athe paging from the second base station, but the terminal does not respond to the paging.

2. The method of claim 1, further comprising:
determining, based on the second indication information, a reason why the terminal does not respond to the paging,
wherein the first indication information is further configured to indicate the reason why the terminal does not respond to the paging.

3. The method of claim 2, wherein the reason at least comprises that the first SIM card is communicating with the first base station, and the method further comprises:
receiving request information sent by the second base station, wherein the request information is configured to request the first base station to suspend the communication with the first SIM card.

4. The method of claim 3, further comprising:
sending third indication information to the first SIM card,
wherein the third indication information is configured to instruct the first SIM card to suspend the communication with the first base station.

5. The method of claim 1, further comprising:
receiving relevant information of the paging sent by the second base station;
sending third indication information to the first SIM card in response to determining, based on the relevant information, that the first SIM card suspends a communication,
wherein the third indication information is configured to instruct the first SIM card to suspend the communication with the first base station.

6. The method of claim 1, further comprising:
determining, based on the second indication information, a duration during which the terminal does not respond to the paging,
wherein the first indication information is further configured to indicate the duration during which the terminal does not respond to the paging.

7. The method of claim 1, further comprising:
sending the first indication information to a core network corresponding to the second base station.

8. A paging control method, performed by a second base station, wherein a first base station performs a communication with a first Subscriber Identity Module (SIM) card of a terminal paged by the second base station, and the second base station pages a second SIM card of the terminal, wherein the method comprises:
receiving first indication information sent by the first base station; and
suspending paging to the terminal in response to determining, based on the first indication information, that the terminal has received the paging from the second base station, but the terminal does not respond to the paging;
wherein the first indication information is sent by the first base station in response to determining, based on second indication information sent by the first SIM card, that the second SIM card has received the paging from the second base station, but the second SIM card does not respond to the paging.

9. The method of claim 8, further comprising:
determining, based on the first indication information, a reason why the terminal does not respond to the paging.

10. The method of claim 9, further comprising:

sending request information to the first base station, in response to the reason at least including that the first SIM card is performing a communication with the first base station;
wherein the request information is configured to request the first base station to instruct the first SIM card to suspend the communication; and
continuing to page the terminal in response to determining, based on response information from the first base station, that the first SIM card suspends the communication with the first base station.

11. The method of claim 8, wherein suspending the paging to the terminal comprises:
determining, based on the first indication information, a duration during which the terminal does not respond to the paging; and
suspending the paging to the terminal within the duration.

12. The method of claim 8, further comprising:
sending fourth indication information to a core network triggering the second base station to page the terminal;
wherein the fourth indication information is configured to indicate that the terminal paged by the second base station has received the paging from the second base station, but the terminal does not respond to the paging.

13. An indication method, performed by a terminal, wherein the terminal at least comprises a first Subscriber Identity Module (SIM) card and a second SIM card; the method comprises:
receiving, by the second SIM card, a paging from a second base station during a communication between the first SIM card and a first base station; and
sending second indication information to the first base station through the first SIM card, in response to determining not to respond to the paging;
wherein the second indication information is configured to indicate that the terminal has received the paging, but the terminal does not respond to the paging.

14. The method of claim 13, wherein the second indication information is configured to further indicate at least one of:
information of the second SIM card;
information of the second base station;
a reason for not responding to the paging; or
a duration during which the paging is not responded to;
wherein determining not to respond to the paging based on at least one of:
service information of the communication between the first SIM card and the first base station; or
service information corresponding to the paging.

15. The method of claim 13, further comprising:
receiving, through the first SIM card, third indication information sent by the first base station;
suspending, based on the third indication information, the communication between the first SIM card and the first base station; and
responding, through the second SIM card, to the paging.

16. The method of claim 15, wherein responding, through the second SIM card, to the paging comprises:
responding, through the second SIM card, to the paging, in response to receiving, by the second SIM card, the paging after the communication between the first SIM card and the first base station is suspended.

17. A communication device, comprising:
a processor; and
a memory for storing a computer program;

wherein when the computer program is executed by the processor, the indication method of claim 1 is performed.

18. A communication device, comprising:

a processor; and a memory for storing a computer program;

wherein when the computer program is executed by the processor, the paging control method of claim 8 is performed.

19. A communication device, comprising:

a processor; and a memory for storing a computer program;

wherein when the computer program is executed by the processor, the indication method of claim 13 is performed.

* * * * *